United States Patent

Galloway

[15] 3,648,078

[45] Mar. 7, 1972

[54] CONTROLLED TIME-RATIO SYSTEM

[72] Inventor: James H. Galloway, New Baltimore, Mich.

[73] Assignee: Udylite Corporation, Warren, Mich.

[22] Filed: Nov. 20, 1969

[21] Appl. No.: 878,487

[52] U.S. Cl. .......... 307/260, 307/229, 307/265, 328/59

[51] Int. Cl. .......... H03k 5/00

[58] Field of Search .......... 307/229, 237, 260, 264, 265, 307/269; 328/175, 209, 127, 142, 59; 330/9, 25, 26, 28

[56] References Cited

UNITED STATES PATENTS

| | | | |
|---|---|---|---|
| 3,040,273 | 6/1962 | Boff | 332/14 |
| 3,188,455 | 6/1965 | Quick, Sr. | 307/229 X |
| 3,294,981 | 12/1966 | Bose | 307/264 X |

*Primary Examiner*—Stanley D. Miller, Jr.
*Attorney*—William J. Schramm and Stanley H. Lieberstein

[57] ABSTRACT

A trigger circuit for use in firing either one or a series of silicon controlled rectifiers or other similar devices by means of a plurality of output pulses, the first pulse being generated at the end of the timed firing angle, the system including an input operational amplifier which receives a first direct current input, the input either being preset or derived from an input control amplifier, this direct current level being utilized by the operational amplifier to produce a preselected DC voltage. The output of the operational amplifier is fed to a timing circuit, the output voltage level of the operational amplifier setting the starting point or starting voltage for the timing circuit. When the timing circuit times out, a free-running multivibrator is caused to operate to produce a series of output pulses, which pulses continue until the end of the half-cycle. Also, a signal which has a characteristic dependent on the firing angle at which the circuit operated, is fed back to the input of the operational amplifier such that the amplifier is adjusted in its operation to cause the timing circuit to time out and set the firing angle in accordance with the input signal being fed to the input circuit of the amplifier.

14 Claims, 2 Drawing Figures

CONTROLLED TIME-RATIO SYSTEM

BACKGROUND AND SUMMARY OF THE DEVELOPMENT

Figure 1:
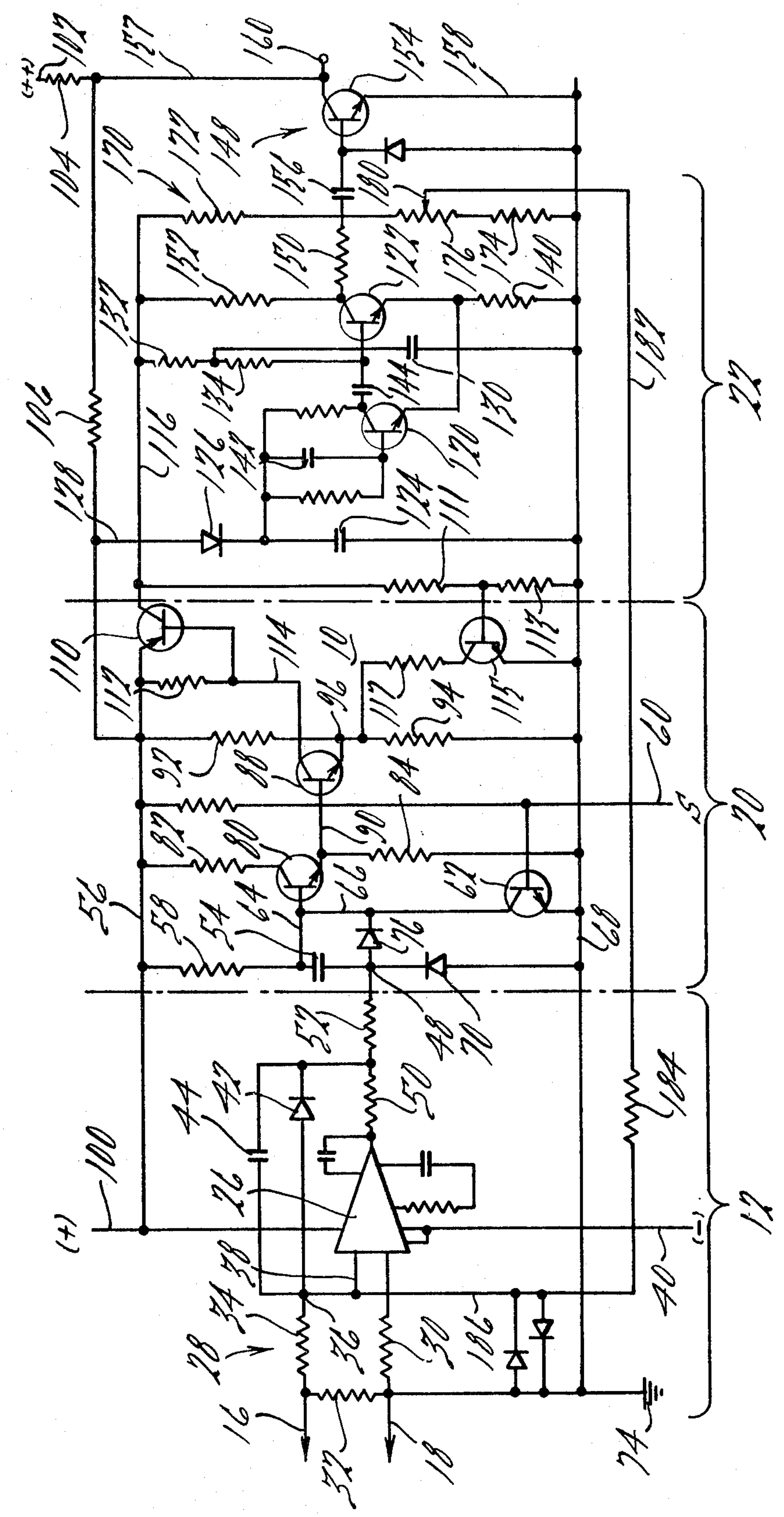

This invention relates generally to a firing circuit and more particularly to a firing circuit which utilizes a form of the output signal as a feedback signal, this signal being compared to the original input signal being fed to the firing circuit whereby the operation of the firing circuit is adjusted to insure that the timing circuit operates in accordance with the preset input signal and does not deviate due to temperature or electrical instabilities.

In the past, many types of firing circuits have been provided for controlling the operation of silicon-controlled rectifiers, thyratrons, gas filled tubes and the like. However, these circuits have been, in one way or another, responsive to changes in environmental and electrical conditions within the system itself. For example, semiconductor devices are highly responsive to changes in temperature, which changes cause a change in the operation of the circuit and thus a change in the output signal. Further, deterioration in the electrical characteristics or changes in the electrical characteristics of the circuit elements also create changes in operation. Thus, adjustments are required, adjustable elements provided and circuit elements carefully chosen to insure reliable operation and that the user may monitor the output signal being generated and calibrate the circuit elements to produce the desired result.

However, with the system of the present invention, a feedback loop has been provided which utilizes a form of the output signal as a feedback signal, which signal is fed back to the input circuit and compared to the input signal to produce a variable intermediate signal, the signal varying in accordance with the deviation of the feedback signal from the input signal. Thus, the circuit is automatically adjusted in operation to compensate for temperature variations, circuit element electrical variations and the like.

Accordingly, it is one object of the present invention to provide an improved trigger circuit.

It is another object of the present invention to provide an improved trigger circuit having an automatic compensation characteristic.

It is still a further object of the present invention to provide an improved trigger circuit which senses a condition of the output signal and feeds this signal condition back to the input circuit for comparison with the desired conditions signaled by the input signal.

It is still a further object of the present invention to provide an improved trigger circuit which incorporates a closed feedback loop which feeds back the actual firing angle generated by the circuit for comparison of this firing angle with the commanded firing angle by the input signal.

It is still a further object of the present invention to provide an improved firing circuit which utilizes an operational amplifier at the input circuit thereof and a summing circuit for the input signal to the operational amplifier.

It is still another object of the present invention to provide an improved trigger circuit which utilizes an operational amplifier in the input stage thereof and a summing circuit as the input circuit to the operational amplifier, the summing circuit receiving a set input signal for selecting the firing angle and an actual firing angle signal indicative of the firing angle generated by the timing circuit.

It is still another object of the present invention to provide an improved firing circuit of the type described above wherein the operational amplifier adjusts the output signal therefrom to render the set input signal equal to the feedback input signal.

It is still a further object of the present invention to provide an improved firing circuit which is wholly temperature and electrical stability compensated without the necessity of utilizing highly compensated circuit elements.

It is still a further object of the present invention to provide an improved trigger circuit which compares the average value of the pulse generated in the timing circuit from the firing point to the end of the half-cycle with the direct current level input signal to adjust the operation of the input circuit of the firing circuit to insure that the two signals are equal.

It is still another object of the present invention to provide an improved trigger circuit which is easily manufactured to provide consistent operational characteristics.

It is still a further object of the present invention to provide an improved trigger circuit which is stable in operation without the requirement for the use of expensive components.

It is still another object of the present invention to provide an improved trigger circuit which is low in cost, stable in operation and reliable in service.

It is still a further object of the present invention to provide an improved trigger circuit which is simple to manufacture and provides consistent operational output characteristics irrespective of temperature changes or circuit element changes.

Figure 2:
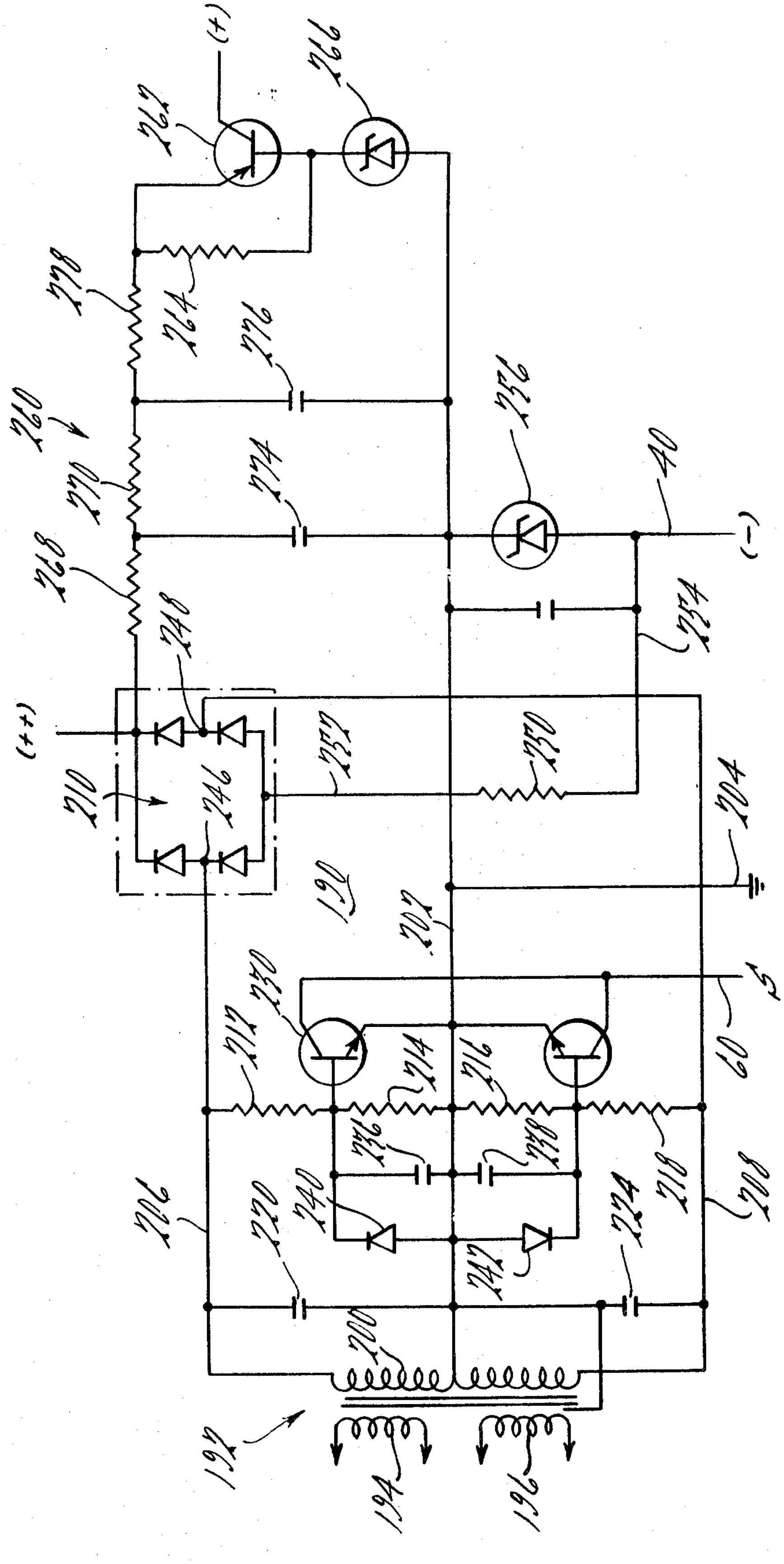

Other objects, features and advantages of the present invention will become readily apparent upon a consideration of the following description, the appended claims, and the drawings in which;

FIG. 1 is a schematic diagram illustrating a preferred form of trigger circuit incorporating certain features of the present invention; and FIG. 2 is a schematic diagram illustrating a preferred form of power supply for use in connection with the trigger circuit of FIG. 1.

Referring now to the drawings, and particular to FIG. 1 thereof, there is illustrated a trigger circuit 10 incorporating the preferred features of the present invention. The trigger circuit 10 includes an input amplifier section 12 which receives an input signal from a pair of input conductors 16, 18, a timer section 20 which determines the phase angle of the output signal in accordance with the signal received from the input amplifier section 12 and an output oscillator section 22 which generates a plurality of pulses from the end of the timed period to the end of the half-wave of line voltage.

Particularly, the input amplifier section receives an input signal across conductors 16, 18 which may either be derived from a set potentiometer or from an input amplifier, the signal, in the preferred embodiment, ranging from 0 to 2 milliamps. The input signal on input conductor 16, 18 is fed to the input circuit of an operational amplifier 26 by means of a resistor network 28 including resistors 30, 32 and 34. The input signal is impressed on node 36 and, from there, to the inverting input terminal, connected to conductor 38, of the operational amplifier 26. The operational amplifier is of the conventional type and is fed a negative regulated DC potential on an input conductor 40 from the power supplied to be discussed in conjunction with FIG. 2. Also, the operational amplifier includes two feedback circuits, the first including a diode 42 and the second including a capacitor 44, the purpose of the capacitor 44 to be described in conjunction with the description of the feedback loop from the output of the system 10 to the input circuit of the operational amplifier 26.

The output of the operational amplifier is fed to a node 48 by means of a pair of resistors 50, 52, the voltage at the node 48 varying from 0 and 5 volts in accordance with the variation of input current from 0 to 2 milliamps. The node 48, comprising the input to the timer section 20, is connected to the lower end of a timing capacitor 54, the upper end of which is connected to a source of positive regulated directed current potential at conductor 56 through a resistor 58. The voltage at the node 48, generated by the operational amplifier 26, establishes a bias potential for the capacitor 54 from which the capacitor 54 is charged to a preselected level from the voltage at the conductor 56.

As will be described in conjunction with FIG. 2, a positive pulse is applied on an input conductor 60 each time that the line voltage is at or crosses the zero-potential line. This pulse is of a relatively small voltage and of a short duration. However, the pulse is of sufficient duration to render a normally nonconductive transistor 62 to the conductive state at the zero crossing. When the transistor 62 is conductive, a discharge path is established for discharging the capacitor 54 through a conductor 64, a second conductor 66, the collector-emitter circuit of transistor 62, a grounded potential 68 and a diode 70. It will be noted that the conductor 68 is grounded at 74. Diode 76 prevents capacitor 54 from being reverse charged due to current from operational amplifier 26 through resistors 50 and 52 and transistor 62 to ground potential 68.

The charge on capacitor 54 is fed to the base circuit of a normally nonconductive transistor 80, the collector electrode of which is connected to the positive potential on conductor 56 by means of a resistor 82 and the emitter electrode of which is connected to the grounded conductor 68 by means of a resistor 84. The emitter electrode of transistor 80 is connected to the base electrode of a second transistor 88 by means of a conductor 90. A voltage divider circuit is connected across the conductors 56, 68 and comprises a pair of resistors 92, 94. The connection between the resistors 92 and 94 (node 96) is connected to the emitter electrode of transistor 88. Thus, a reference potential is established at the emitter electrode of transistor 88 by means of the voltage established at node 96. This reference voltage is compared to the voltage at the upper plate of capacitor 54, as fed to the base electrode of transistor 80, and, when the base emitter circuits of both transistors 80 and 88 are forward biased, the transistors 80, 88 are rendered conductive.

The conductor 56, in addition to providing a supply voltage as described above, also supplies electrical energy to an output transistor 154, to be hereinafter described. This energy is supplied by means of an input conductor 100, which is connected to a regulated DC positive voltage, conductors 56 and 157, and resistor 106. The transistor 154 is also supplied with a second unregulated DC voltage of higher potential connected to input conductor 102. The voltage established at conductor 100 is slightly delayed from that established at input conductor 102 due to a delay circuit to be described in conjunction with FIG. 2. The two supplies are used to insure that voltage is always available at transistor 154. The voltage on conductor 56 is isolated from the oscillator circuit 22 by means of a switching transistor 110, which is normally nonconductive during the period that the timing circuit 20 is energized or the capacitor 54 is charging.

The conduction of transistor 110 establishes a potential across a voltage divider circuit, including a resistor 111 and a second resistor 113, connected between the collector electrode of transistor 110 and the conductor 68. The potential between the resistors 111 and 113 is fed to the base electrode of a transistor 115 to forward bias and cause conduction of the transistor 115. The conduction of transistor 115 lowers the potential at node 96 due to the fact that the node 96 is connected to the collector electrode of transistor 115 through a resistor 117. The lowering of the potential at node 96 lowers the emitter voltage of transistor 88 to "snap" the transistor 88 to the saturation state. The saturation of transistor 88 also saturates transistor 80 and tends to saturate transistor 110.

Upon the conduction of transistor 88, the emitter-base circuit of transistor 110 is forward biased to render normally nonconductive transistor 110 to the conductive state. This occurs because of the fact that the collector electrode is connected to the direct current potential at conductor 56 through a resistor 112 and a conductor 114. The conduction of transistor 88 will establish a voltage drop across resistor 112 to forward bias the emitter-base circuit of transistor 110. The conduction of transistor 110 will establish a DC potential on conductor 116 to energize the oscillator circuit 22.

The oscillator circuit 22 includes a pair of NPN-transistors 120, 122 which are connected in the conventional manner. During the time that the transistor 110 is nonconductive, a capacitor 124 is connected to the left side of resistor 106, and thus to the DC potential at input terminal 102, by means of a diode 126 and a conductor 128. Thus, the capacitor 124 is charged continually and is used as a filter and to insure starting of the oscillator circuit 22. The conduction of transistor 110 causes a capacitor 130 to charge through a circuit which includes a voltage divider having a pair of resistors 132, 134. Particularly, the capacitor 130 is charged from conductor 116 through resistor 132 to the conductor 68. The relative values of resistors 132, 134 and capacitor 130 are selected to lengthen the first pulse to insure that all pulses from the oscillator are equal in duration.

As was stated above, the transistors 120, 122 are connected in the conventional manner with a common, emitter resistor 140 and a pair of control capacitors 142, 144 which control the alternate conduction of transistors 120, 122. The output circuit 148 is connected to the collector electrode of transistor 122 by means of a resistor 150, the collector electrode also being connected to the positive DC potential at conductor 116 by means of a resistor 152.

Thus, upon the initiation of operation of the oscillator circuit 22, a series of pulses is generated at the collector electrode of transistor 122 which are fed forward to an output transistor 154 by means of a resistor 150 and a coupling capacitor 156. The collector electrode of transistor 154 is connected to the DC potential at terminal 102 by means of a conductor 157 and the emitter electrode is grounded by means of a conductor 158. Thus, a series of short duration high amplitude pulses is generated at an output terminal 160 from approximately the time that the transistor 110 is rendered conductive to the end of the half-cycle which has been timed.

This series of pulses is generated in order to insure that at least one pulse has been generated after the zero-current point in the output circuit being controlled. As is well known in the art, an inductive circuit may be controlled by means of a controlled rectifier and the voltage may lead the current by a preselected amount depending on the power factor of the circuit being controlled. Thus, if a single pulse were generated before the zero-current point in the load circuit, the controlled rectifier would not be fired and the load circuit would remain off for the remainder of the half-cycle. On the other hand, if a series of pulses is generated, the controlled rectifier will be fired on the first pulse after the zero-current crossing.

The conduction of transistor 110 also establishes a voltage across a voltage divider circuit 170, which includes a pair of fixed resistors 172, 174 and an adjustable potentiometer 176. It will be remembered that the transistor 110 is rendered conductive from the end of the timed period to the end of the half cycle in which the period is timed. Thus, a pulse is generated across the voltage divider circuit 170 connected between the positive direct current potential and ground, the pulse having a duration which is exactly equal to the time that the oscillator is producing the series of output pulses. Another way of expressing the duration of the pulse is that the pulse is of a duration which is 180° less the period required to time out the timer circuit 20.

The potentiometer 176 includes a slide arm 180 which is connected to a feedback conductor 182 and a feedback resistor 184, the left end of the feedback resistor being fed to the input conductor 38 of the operational amplifier 26 by means of a conductor 186. Thus, the resistors 34 and 184 form a summing circuit for the input to the operational amplifier 26. As is well known in the art, the operational amplifier will produce an output voltage which is sufficient to drive the signal being fed to the operational amplifier from resistor 184 equal to the signal being fed from the resistor 34.

However, as is explained above, the signal across resistor 184 is in the form of a pulse having a start at the end of the timed period or at the firing angle and having a finish at the end of the half-wave which is being timed. Accordingly, it is desirable to utilize the average value of this pulse. This average value is generated by means of the capacitor 44 which integrates the pulse being fed to the input circuit of the operational amplifier 26 by means of the resistor 184, and the capacitor acts as a current sink for the current flowing through resistor 184. Thus, the operational amplifier adjusts its output to make the average value of the pulse being fed back equal to the steady DC current being fed through resistor 34.

In operation, a 0- to 2-milliamp signal is fed to the operational amplifier 26, which generates a 0- to 5-volt potential, the magnitude of the potential depending on the magnitude of the current flowing, through resistor 34, to the node 48. The potential at node 48 establishes a bias potential across capacitor 54 which forms a starting point for the charging of capacitor 54 and the capacitor 54 is then charged through resistor 58 from the potential at line 56. When the charge on capacitor 54 is sufficient to forward bias the base-emitter circuits of transistor 80 and 88 relative to the reference potential established at node 96, the transistors 80, 88 will commence conduction to cause conduction on the transistor 110. The conduction of transistor 88 and transistor 110 also causes the conduction of transistor 115 to snap transistors 80, 88 and 110 to the saturation state.

The conduction of transistor 110 causes the oscillator circuit, including transistor 120 and 122, to commence generation of a plurality of short-duration, high-impulse output pulses at output terminal 160. Also, a voltage divider circuit 170 is energized to create a feedback signal on conductor 182. This feedback signal is fed to the input circuit of operational amplifier 26 in a summing configuration with the input signal being fed through the resistor 34. When a variation between the average value of the current being fed through the resistor 184 occurs from the steady DC level of current being fed through resistor 34, the operational amplifier 26 will change its state of operation to either decrease or increase the voltage level at node 48 to establish equilibrium conditions between the average value of the feedback current through resistor 184 and the input current through resistor 34.

Referring now to FIG. 2, there is illustrated a power supply circuit 190 which may be utilized in conjunction with the circuit of FIG. 1. Particularly, the power supply includes an input transformer 192 having a plurality of primary windings 194, 196, magnetically coupled to a center-tapped, secondary winding 200. The center tap is grounded by means of a conductor 202 and a ground connection 204. The upper end of the secondary winding 200 is connected to a conductor 206 and the lower end is connected to conductor 208, the conductors 206 and 208 being connected to the input terminal of the bridge circuit 210.

Also, a voltage divider circuit including resistors 212, 214, 216 and 218 are connected across the conductors 206 and 208. Further, suitable filter capacitors 220, 224 are connected across conductors 206 and 208 to filter the supply voltage between the ground connection 202 and the conductor 206 and the ground connection 202 and the conductor 208.

As is explained above, a signal line 60 provides a pulse to the reset circuit for discharging capacitor 54 from the power supply circuit, this signal taking the form of a low amplitude short duration pulse occurring at the zero-crossing point for the current. This signal is established by means of a pair of transistors 230, 232 which are connected in circuit with the ground conductor 202 and the conductors 206, 208. Accordingly, when the conductor 206 goes positive relative to the ground potential at 202, the base-emitter circuit of transistor 230 will be rendered conductive to connect conductor 60 to ground potential during the conduction of transistor 230. On the other hand, the transistor 232 is similarly rendered conductive when the potential on conductor 208 goes sufficiently positive to forward bias the base-emitter circuit of transistor 232.

Accordingly, the conductor 60 will be at ground potential during the period that the transistors 230, 232 are conductive on alternate half-cycles. However, during the zero crossing, and shortly thereafter, both transistors 230, 232 will be nonconductive to produce a high-positive potential on conductor 60. A slight delay is created by means of a pair of capacitors 236, 238 and discharge diodes 240, 242. Also, the capacitors 236, 238 create a slight filtering effect for the voltage being fed to the transistors 230, 232.

As was stated above, the signals on conductors 206 and 208 are fed to a bridge circuit 210 through input terminals 246, 248. The negative output of the bridge circuit 210 is fed across a resistor 250 by means of a conductor 252. Thus, a negative potential is established between the lower end of resistor 250, connected to a conductor 254, and the conductor 202. The voltage between these two points is regulated by means of a zener diode 256 to produce regulated, negative DC potential at the output conductor 40 described in conjunction with FIG. 2.

The positive output from the bridge circuit 210 is fed through a delay circuit 260 to an output transistor 262 by means of a resistor 278 and a zener diode 266. The resistor 264 bypasses emitter-base current for transistor 262 until zener diode 266 is in full conduction. Zener diode 266 also regulates the voltage being fed to the base electrode of the transistor 256. The delay circuit 260 includes a plurality of resistor-capacitor combinations including resistors 268, 270, which are associated with capacitors 274, 276 respectively. The output from the delay line is fed to the output transistor circuit by means of a resistor 278. The delay established by the delay circuit 260 insures that the trigger circuit is not operational until the equipment power circuit has had time to stabilize after application of power.

From the foregoing, it is seen that a highly regulated, temperature-compensated, reliable, trigger circuit has been provided which has many uses in the art including controlling the load current being fed to the electrolytic circuit or other types of power supply circuits. It is to be understood that many variations could occur in the design of the circuits of FIGS. 1 and 2 while still keeping within the scope of the present invention. For example, a system could be provided which integrates the feedback signal being fed to the input circuit of the operational amplifier 26 before the signal actually reaches the operational amplifier. Further, in certain systems, it is not necessary to generate the series of pulses due to the fact that the firing angle is insured of occurring after the zero-current point. For example, in purely resistive loads or in loads where the firing angle is of such a great magnitude as to be insured that it will occur after the zero-current point. Also, certain other timing circuits may be utilized within the scope of the present invention.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a pulse generating circuit for generating at least one controlled duration pulse in response to an input signal established at input element, the improvement comprising an input circuit including an active subsystem for generating an intermediate signal and an input node to which the input element is connected and input signal is fed, a pulse-generating timing circuit for generating the output pulse in response to said intermediate signal and a feedback loop connected between said active subsystem and said input node, said feedback loop and the input element establishing a preselected electrical condition at said input node, said active subsystem adjusting its operation to maintain said preselected node condition, said input node establishing a summing circuit between said input element and said feedback loop, said pulse generating circuit including an energy storage element and means associated with said energy storage element for establishing a timing constant, said intermediate signal establishing a preselected bias on said energy element, said timing circuit including a switching element, a reference circuit, and comparator circuit means for comparing the stored energy in said energy storage element with a condition of said reference circuit, said switching element being connected to control energy being fed to said feedback loop.

2. The improvement of claim 1 wherein said comparator circuit generates an output signal in response to the condition at said energy storage device exceeding said condition in said reference circuit.

3. The improvement of claim 2 wherein said comparator circuit-generated signal actuates said switching element to apply the source energy to said feedback loop.

4. The improvement of claim 3 wherein the actuation of said switching element establishes the start of said controlled pulse.

5. The improvement of claim 4 further including means for terminating the actuation of said output pulse.

6. The improvement of claim 4 wherein said input signal is a variable, preselectable current level.

7. The improvement of claim 6 wherein said intermediate signal is a variable voltage level, the level being dependent on the preselection of said input current.

8. The improvement of claim 7 wherein said feedback loop supplies a feedback signal which is a function of said controlled pulse.

9. The improvement of claim 8 further including means for deriving the average value of said feedback signal.

10. The improvement of claim 9 wherein said operational amplifier adjusts its operation to generate the intermediate signal as a function of both said input current and the average value of said feedback current.

11. The improvement of claim 10 wherein said input node forms a summing circuit for said input element and said feedback loop, said operational amplifier adjusting its operation and the intermediate signal to maintain a zero-current condition at said input node.

12. The improvement of claim 4 said timing circuit further includes output oscillating circuit means for generating a plurality of output pulses in response to the initiation of said controlled pulse.

13. The improvement of claim 12 wherein said oscillating circuit means includes a free running multivibrator which is actuated in response to actuation of said switching means, said multivibrator terminating the generation of pulses in response to the deactuation of said switching means.

14. The improvement of claim 1 wherein said comparator circuit includes at least one three terminal semiconductor device having a diode junction, the diode junction being forward biased in response to the charge on the energy storage means exceeding said condition at said reference circuit.

* * * * *